United States Patent
Yun et al.

(10) Patent No.: US 11,795,271 B2
(45) Date of Patent: *Oct. 24, 2023

(54) POLYIMIDE BASED FILM FOR COVER WINDOW AND DISPLAY DEVICE COMPRISING THE SAME

(71) Applicants: SK Innovation Co., Ltd., Seoul (KR); SK ie technology Co., Ltd., Seoul (KR)

(72) Inventors: Cheol Min Yun, Daejeon (KR); Hye Jin Park, Daejeon (KR)

(73) Assignees: SK Innovation Co., Ltd., Seoul (KR); SK ie technology Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/838,833

(22) Filed: Jun. 13, 2022

(65) Prior Publication Data

US 2023/0002556 A1 Jan. 5, 2023

(30) Foreign Application Priority Data

Jun. 14, 2021 (KR) .................. 10-2021-0076548

(51) Int. Cl.
*C08G 73/10* (2006.01)
*C08J 5/18* (2006.01)
*B32B 27/28* (2006.01)

(52) U.S. Cl.
CPC ........ *C08G 73/1067* (2013.01); *B32B 27/281* (2013.01); *C08G 73/1039* (2013.01); *C08G 73/1042* (2013.01); *C08G 73/1064* (2013.01); *C08J 5/18* (2013.01); *B32B 2457/20* (2013.01); *C08J 2379/08* (2013.01)

(58) Field of Classification Search
CPC ........ C08J 7/0427; C08J 5/18; C08J 2379/08; B32B 27/281; B32B 2457/20; C08L 2201/10; C08L 2203/16; C08G 73/1042; C08G 73/1032; C08G 73/1039; C08G 73/1064; C08G 73/1075; G09F 9/301
See application file for complete search history.

(56) References Cited

U.S. PATENT DOCUMENTS

| | | | |
|---|---|---|---|
| 2020/0095376 A1 | 3/2020 | Yun et al. | |
| 2021/0009760 A1 | 1/2021 | Nakayama et al. | |
| 2021/0024699 A1* | 1/2021 | Uno | H05K 1/03 |

FOREIGN PATENT DOCUMENTS

| | | | | |
|---|---|---|---|---|
| CN | 111971327 A | | 11/2020 | |
| JP | 2016162403 A | * | 9/2016 | |
| JP | 2019108539 A | * | 7/2019 | |
| KR | 1020160037489 A | | 4/2016 | |
| KR | 1020190038268 A | | 4/2019 | |
| WO | WO-2014148441 A1 | * | 9/2014 | ............. B32B 27/08 |
| WO | WO-2021031924 A1 | * | 2/2021 | ......... C08G 73/1007 |

* cited by examiner

*Primary Examiner* — John D Freeman
(74) *Attorney, Agent, or Firm* — THE WEBB LAW FIRM

(57) ABSTRACT

An embodiment relates to a polyimide based film for a cover window that may satisfy required performance of an advanced cover window, and a use thereof, and the polyimide based film for a cover window according to the embodiment has excellent visibility without optical stains without deterioration in colorless and transparent optical physical properties, and excellent heat resistance and mechanical physical properties, and thus, may be usefully used for optical applications or the purpose of replacing existing tempered glass. In addition, the polyimide based film for a cover window according to an embodiment may be usefully used in a multilayer structure and a display device.

10 Claims, No Drawings

POLYIMIDE BASED FILM FOR COVER WINDOW AND DISPLAY DEVICE COMPRISING THE SAME

CROSS-REFERENCE TO RELATED APPLICATION

This application claims priority to Korean Patent Application No. 10-2021-0076548 filed Jun. 14, 2021, the disclosure of which is hereby incorporated by reference in its entirety.

BACKGROUND OF THE INVENTION

Field of the Invention

The following disclosure relates to a polyimide based film for a cover window, and a display device including the same.

Description of Related Art

A polyimide (PI) based film has insoluble and infusible ultra-high heat resistance, and has excellent thermal oxidation resistance, heat resistance, radiation resistance, low temperature characteristics, and chemical resistance. Accordingly, the polyimide based film has been used in a wide range of technical fields, such as heat-resistant high-tech materials such as automobile materials, aviation materials, and spacecraft materials, as well as electronic materials such as an insulation coating agent, an insulating film, semiconductor, and an electrode protective film of TFT-LCD, and recently, is also attracting attention as a material to replace expensive tempered glass used as cover windows for portable electronic devices and communication devices.

A cover window for portable electronic devices and communication devices is intended to protect electronic components such as printed wiring boards and lead frames of semiconductor integrated circuits, and needs to have a certain level or higher of insulation. In addition, as portable electronic devices and communication devices become thinner, slimmer and flexible, flexibility as well as mechanical physical properties such as high hardness and high rigidity are required. In addition, in general, as a coating layer is multilayered on a substrate to provide various physical properties, diffuse reflection of light is induced in the cover window and optical staining may deteriorate visibility. Accordingly, high display quality and optical physical properties such as no mura phenomenon are also required.

SUMMARY OF THE INVENTION

An embodiment is directed to providing a polyimide based film for a cover window that may satisfy required performance of an advanced cover window.

In detail, another embodiment is directed to providing a polyimide based film for a cover window that may have a low retardation in a thickness direction in a visible ray region, may be effective in preventing reflection in a wide viewing angle, and may significantly reduce a mura phenomenon.

In detail, still another embodiment is directed to providing a polyimide based film for a cover window that may prevent colorless and transparent optical physical properties from deteriorating, have no optical stain, have excellent optical physical properties such as visibility, and have excellent heat resistance and mechanical physical properties.

Another embodiment is directed to providing a cover window for a display device including the polyimide based film.

Another embodiment is directed to providing a flexible display device including the polyimide based film or the cover window.

In a general aspect, a polyimide based film of a cover window comprises a structural unit derived from a dianhydride, and a structural unit derived from a diamine, in which the structural unit derived from the dianhydride may comprise a structural unit derived from a compound represented by Chemical Formula 1 below and a structural unit derived from a compound represented by Chemical Formula 2 below, the structural unit derived from the diamine may comprise a structural unit derived from a compound represented by Chemical Formula 3 below and a structural unit derived from a compound represented by Chemical Formula 4 below, and in the polyimide based film, a thickness may be 30 to 150 μm, an absolute value of retardation in a thickness direction at a wavelength of 550 nm may be 500 nm or less, and a yellow index (YI) according to ASTM E313 may be 3.5 or less.

[Chemical Formula 1]

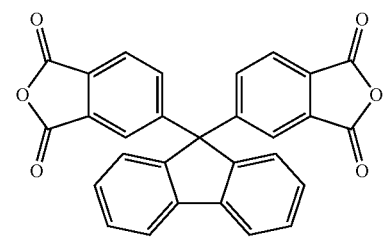

[Chemical Formula 2]

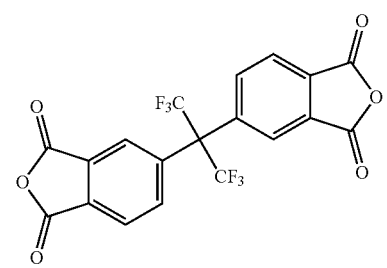

[Chemical Formula 3]

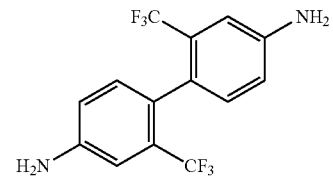

[Chemical Formula 4]

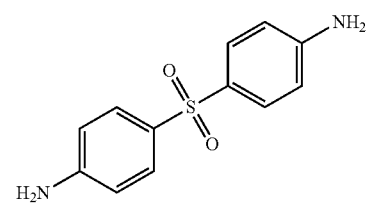

Wavelength dispersibility may satisfy Expressions 1 and 2 below.

$$1.06 \leq R\text{th}(450\text{ nm})/R\text{th}(550\text{ nm}) \leq 1.10 \qquad \text{[Expression 1]}$$

$$0.95 \leq R\text{th}(650\text{ nm})/R\text{th}(550\text{ nm}) \leq 0.98 \qquad \text{[Expression 2]}$$

[in the Expressions 1 and 2 above,

Rth (450 nm) is an absolute value (unit, nm) of retardation in a thickness direction at a wavelength of 450 nm, Rth (550 nm) is an absolute value (unit, nm) of retardation in a thickness direction at a wavelength of 550 nm, and Rth (650 nm) is an absolute value (unit, nm) of retardation in a thickness direction at a wavelength of 650 nm.]

A modulus according to ASTM E111 may be 4 GPa or more, and a breaking elongation may be 15% or more.

The structural unit derived from the compound represented by the Chemical Formula 1 may be included in an amount of 70 to 95 mol % based on 100 mol % of the structural unit derived from the dianhydride.

The structural unit derived from the compound represented by the Chemical Formula 3 may be included in an amount of 70 to 95 mol % based on 100 mol % of the structural unit derived from the diamine.

A thickness may be 40 to 80 μm, an absolute value of retardation Rth in a thickness direction at a wavelength of 550 nm may be 50 to 250 nm, a yellow index (YI) according to ASTM E313 may be 1.0 to 2.7, a modulus according to ASTM E111 may be 4 GPa or more, and a breaking elongation may be 15% or more.

In another general aspect, there may be provided a multilayer structure comprising a polyimide based film formed on one surface of a substrate.

In still another general aspect, there may be provided a cover window for a display device comprising: the polyimide based film; and a coating layer formed on the polyimide based film.

The coating layer may be a hard coating layer, an antistatic layer, an anti-fingerprint layer, an antifouling layer, an anti-scratch layer, a low refractive layer, an antireflection layer, an impact absorption layer, or a combination thereof.

In still yet another general aspect, there may be provided a flexible display device comprising the polyimide based film.

According to a polyimide based film for a cover window according to an embodiment, it is possible to remarkably improve a mura phenomenon that causes deterioration in visibility, in particular, a rainbow phenomenon by retardation.

In addition, it is possible to implement colorless and transparent optical physical properties even in a thickness range having a mechanical strength similar to that of tempered glass. In addition, it is possible to remarkably improve a reflective appearance by having a low retardation Rth in a thickness direction in a wide visible ray region. At the same time, it is possible to prevent breakage or cracks due to bending by excellent bending characteristics as well as the above-described high strength characteristics. Accordingly, a polyimide based film for a cover window according to an embodiment may be usefully applied for optical purposes such as a foldable display device or a flexible display device.

DESCRIPTION OF THE INVENTION

Hereinafter, one embodiment will be described in detail so that a person of ordinary skill in the art to which the present disclosure pertains can easily implement the present disclosure. However, the present disclosure may be implemented in various different forms and is not limited to embodiments described herein. In addition, embodiments are not intended to limit the scope of protection limited by the claims In addition, technical terms and scientific terms used herein may have meanings commonly understood by those of ordinary skill in the art to which the present disclosure pertains, unless otherwise defined.

Throughout the present specification, when a part "includes" a certain component, it may mean that it may further other components, rather than excluding other components, unless otherwise stated.

When an element such as a layer, a film, a thin film, a region, and a plate is "on" or "over" another component in the specification, it can be directly on the other element or intervening elements may be present therebetween, unless otherwise defined.

Hereinafter, unless otherwise defined herein, the term "combination thereof" may mean mixing or copolymerization of constituents.

Hereinafter, unless otherwise defined in the present specification, "A and/or B" may mean an aspect including A and B at the same time, and may mean an aspect selected from A and B.

Hereinafter, unless otherwise specified in the present specification, "derived" means that at least one of functional groups of a compound is modified, and specifically includes a form in which a reactive group and/or a leaving group of the compound are modified or left according to the reaction. In addition, if structures derived from different compounds are the same as each other, structures derived from one compound may be derived from another compound and have the same structure.

Unless otherwise defined herein, "polymer" refers to a molecule having a relatively high molecular weight, and its structure may include multiple repeats of units derived from molecules of a low molecular weight. In one aspect, the polymer is an alternating copolymer, a block copolymer, a random copolymer, a branched copolymer, a crosslinked copolymer, or a copolymer (e.g., a copolymer comprising more than one type of monomer) comprising both. In another aspect, the polymer may be a homopolymer (e.g., a copolymer comprising one monomer).

Hereinafter, unless otherwise defined herein, "polyamic acid" may refer to a polymer comprising a structural unit having an amic acid moiety, and "polyimide" may refer to a polymer comprising a structural unit having an imide moiety.

Hereinafter, unless otherwise defined herein, the term "mura phenomenon" may be interpreted to encompass all distortion phenomena caused by light that may be caused at a specific angle. For example, a display device including a polyimide based film may include distortions by light, such as a blackout phenomenon in which a screen appears black, a hot spot phenomenon, or a rainbow phenomenon having iridescent stains.

Hereinafter, a polyimide based film for a cover window according to an embodiment will be described.

The polyimide based film is attracting attention as a material to replace expensive tempered glass used as a conventional cover window, but the polyimide based film is distorted by light. However, since a phenomenon generated by light is directly visible to the cover window formed at an outermost part of the display device, it is very important that distortion by light does not occur. Accordingly, there is a need for the polyimide based film capable of fundamentally solving problems caused by the distortion by light.

The polyimide based film for a cover window according to the embodiment may comprise a structural unit derived from a dianhydride, and a structural unit derived from a diamine, and specifically, the structural unit derived from the dianhydride may comprise a structural unit derived from a compound represented by Chemical Formula 1 below and a structural unit derived from a compound represented by Chemical Formula 2 below, and the structural unit derived from the diamine may comprise a structural unit derived from a compound represented by Chemical Formula 3 below and a structural unit derived from a compound represented by Chemical Formula 4 below. Here, in the polyimide based film, a thickness may be 30 to 150 μm, an absolute value of retardation Rth in a thickness direction at a wavelength of 550 nm may be 500 nm or less, and a yellow index (YI) according to ASTM E313 may be 3.5 or less. Accordingly, it is possible to reduce a distortion by light of the cover window including the polyimide based film for the cover window by having excellent transparency even in a thickness of 30 μm or more and reducing the distortion by light. In addition, when viewed from various angles while being able to replace tempered glass, it is possible to provide better optical physical properties compared to the conventional polyimide based film by remarkably improving rainbow mura which forms iridescent stains.

[Chemical Formula 1]

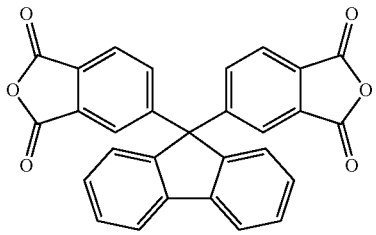

[Chemical Formula 2]

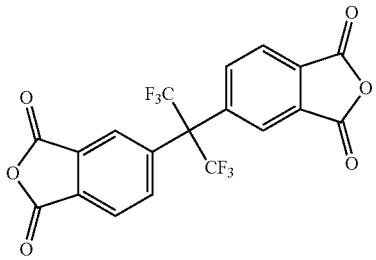

[Chemical Formula 3]

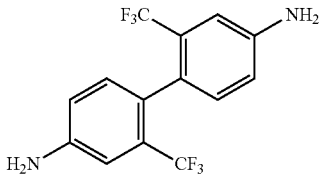

[Chemical Formula 4]

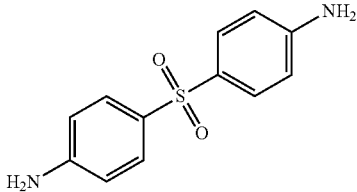

The retardation value in the thickness direction may be measured at normal temperature before heating the film, and the normal temperature may be a temperature in a state in which temperature control is not artificially performed. For example, the room temperature may be 20° C. to 40° C., 20° C. to 30° C., or 23° C. to 26° C.

As described above, the polyimide based film for a cover window may comprise structural units derived from the compounds represented by the Chemical Formulas 1 to 4, thereby more improving the distortion phenomenon by light compared to a polyimide based film including a polyimide polymer having a rigid structure. For example, in the polyimide based film for a cover window according to the embodiment, the structural unit derived from the dianhydride may not comprise a rigid structural unit, and may not comprise, for example, a structural unit derived from a dianhydride in which two anhydride groups are fused to one ring. The ring may be a single ring or a fused ring, and may be an aromatic ring, an aliphatic ring, or a combination thereof. Specifically, the structural unit derived from the dianhydride may not comprise a structural unit derived from pyromellitic dianhydride (PMDA), a structural unit derived from cyclobutane-1,2,3,4-tetracarboxylic dianhydride (CBDA), or a combination thereof.

Accordingly, the polyimide based film for a cover window according to the embodiment may implement a low retardation in the thickness direction while being transparent even at a thickness of 30 μm or more, and further improve visibility, thereby further reducing eye fatigue when the cover window including the polyimide based film for a cover window is used. In addition, even if the polyimide based film for a cover window has a thickness of 30 μm or more, since the polyimide based film for a cover window may further improve excellent optical characteristics, the polyimide based film may further improve mechanical strength such as modulus, and further improve dynamic bending physical properties, and thus, may be more suitable for application as a cover window of a flexible display device that repeatedly performs a folding and unfolding operation.

For example, the polyimide based film for a cover window may satisfy Expression 1 below. By satisfying Expression 1, the polyimide based film for a cover window may have positive dispersion characteristics, and may have a substantially constant retardation value in a thickness direction even when moving to a long wavelength region. Accordingly, the polyimide based film for a cover window may provide a better viewing angle and visibility, and minimize wavelength dispersion to further improve a reflective appearance.

$$1.06 \leq R\text{th}(450 \text{ nm})/R\text{th}(550 \text{ nm}) \leq 1.10$$ [Expression 1]

[in the Expression 1 above,

Rth (450 nm) is an absolute value (unit, nm) of retardation in a thickness direction at a wavelength of 450 nm, and Rth (550 nm) is an absolute value (unit, nm) of retardation in a thickness direction at a wavelength of 550 nm.]

For example, in the Expression 1 above, Rth (450 nm)/Rth (550 nm) may be 1.095 or less, for example, 1.09 or less.

For example, the polyimide based film for a cover window may satisfy Expression 2 below. By satisfying Expression 2 below, the polyimide based film for a cover window may exhibit more stable positive dispersibility even when moving to a long wavelength region. Accordingly, since the polyimide based film for a cover window satisfies Expression 2, visibility may be further improved.

$$0.95 \leq R\text{th}(650\ \text{nm})/R\text{th}(550\ \text{nm}) \leq 0.98 \qquad \text{[Expression 2]}$$

[in the Expression 2 above,

Rth (550 nm) is an absolute value (unit, nm) of retardation in a thickness direction at a wavelength of 550 nm, and Rth (650 nm) is an absolute value (unit, nm) of retardation in a thickness direction at a wavelength of 650 nm.]

For example, in the Expression 2 above, Rth (650 nm)/Rth (550 nm) may be 0.955 or more, for example, 0.96 or more.

More specifically, the polyimide based film for a cover window may satisfy the Expressions 1 and 2 at the same time, and as a result, the positive dispersibility may be further improved.

For example, the structural unit derived from the compound represented by the Chemical Formula 1 may be included in an amount of 70 to 95 mol % based on 100 mol % of the structural unit derived from the dianhydride. Here, the structural unit derived from the dianhydride may be, specifically, a structural unit derived from the compound represented by Chemical Formula 1 and a structural unit derived from the compound represented by Chemical Formula 2, and the total mole thereof may be defined as 100 mol %. By comprising the structural unit derived from the dianhydride as described above, even when the thickness of the polyimide based film for a cover window is 30 μm or more, it is possible to have better mechanical physical properties such as modulus and breaking elongation as well as providing more transparent and low retardation in a thickness direction. Accordingly, the optical and mechanical physical properties equivalent to or superior to those of tempered glass may be implemented.

Specifically, the structural unit derived from the compound represented by the Chemical Formula 1 may include 70 to 90 mol %, more specifically 70 to 85 mol %, based on 100 mol % of the structural unit derived from the dianhydride. Since the structural unit derived from the compound represented by the Chemical Formula 1 is included in the above-described range, the mechanical and optical physical properties may be more excellent at the same time.

For example, the structural unit derived from the compound represented by the Chemical Formula 3 may be included in an amount of 70 to 95 mol % based on 100 mol % of the structural unit derived from the diamine. Here, the structural unit derived from the diamine may be, specifically, a structural unit derived from the compound represented by the Chemical Formula 3 and a structural unit derived from the compound represented by the Chemical Formula 4, and the total mole thereof may be defined as 100 mol %. By comprising the structural unit derived from the diamine as described above, even when the thickness of the polyimide based film for a cover window is 30 μm or more, it is possible to further improve visibility due to more stable positive dispersibility and have the mechanical physical properties such as more excellent modulus and breaking elongation. Accordingly, the optical and mechanical physical properties equivalent to or superior to those of tempered glass may be implemented.

Specifically, the structural unit derived from the compound represented by the Chemical Formula 3 may include 70 to 90 mol %, more specifically 75 to 90 mol %, based on 100 mol % of the structural unit derived from the diamine. Since the structural unit derived from the compound represented by the Chemical Formula 3 is included in the above-described range, the optical physical properties may be more excellent.

When the polyimide based film for a cover window according to the embodiment has a thickness of 30 to 150 μm, the absolute value of the retardation Rth in the thickness direction at a wavelength of 550 nm may be 400 nm or less, or 350 nm or less, or 50 to 300 nm.

In addition, when the polyimide based film for a cover window according to the embodiment has a thickness of 40 to 80 μm, the absolute value of the retardation Rth in the thickness direction at a wavelength of 550 nm may be 50 to 250 nm, 80 to 240 nm, 90 to 240 nm, or 90 to 220 nm.

In addition, when the polyimide based film for a cover window according to the embodiment has a thickness of 30 to 150 μm, a yellow index may be 3.0 or less, 2.7 or less, or 1 to 2.7.

When the polyimide based film for a cover window according to the embodiment has a thickness of 40 to 80 μm, the yellow index may be 1.0 to 2.7, or 1.5 to 2.5.

Specifically, when the polyimide based film for a cover window according to the embodiment has a thickness of 30 to 150 μm, the polyimide based film for a cover window may simultaneously satisfy the retardation Rth in the thickness direction at a wavelength of 550 nm and the yellow index. Further, when the polyimide based film for a cover window has a thickness of 40 to 80 μm, the polyimide based film for a cover window may simultaneously satisfy the retardation Rth in the thickness direction at a wavelength of 550 nm and the yellow index.

In addition, when the polyimide based film for a cover window according to the embodiment has a thickness of 30 to 150 m, the polyimide based film may be a polyimide based film satisfying that (a) the modulus according to ASTM E111 is 4 GPa or more, and (b) the breaking elongation is 15% or more, and more specifically, may be a polyimide based film satisfying the mechanical physical properties as well as the retardation Rth in the thickness direction at a wavelength of 550 nm and the yellow index as described above.

The polyimide based film for a cover window according to an embodiment may have, specifically, a modulus of 4.1 GPa or more, or 4.1 to 6 GPa according to ASTM E111. In addition, the polyimide based film for a cover window may have a breaking elongation of 15% or more, 16% or more, 18% or more, 20% or more, or 25 to 40%, and may satisfy, specifically, the modulus and breaking elongation described above. Accordingly, it is possible to provide sufficient mechanical physical properties and durability to be applied to the cover window.

As the polyimide based film for a cover window according to the embodiment satisfies all of the retardation in the thickness direction, the yellow index, the modulus, and the breaking elongation in the above-described ranges, it is possible to prevent image distortion by light and provide further improved visibility. In addition, more uniform mechanical physical properties (modulus, etc.) and optical physical properties (retardation in the thickness direction, etc.) may be exhibited as a whole in a central portion and an edge portion of the film, and the film loss may be further reduced. In addition, since the polyimide based film for a cover window is flexible and has excellent bending characteristics, the film is not deformed and/or damaged even if a predetermined deformation occurs repeatedly, and may be more easily restored to its original shape.

A cover window including the polyimide based film for a cover window according to the embodiment may have more excellent visibility, and prevent the occurrence of folding marks and microcracks to provide better durability and long-term lifespan of the flexible display device.

The polyimide based film for a cover window according to an embodiment may be made of a polyimide resin comprising the structural unit derived from the diamine and dianhydride exemplified above, and specifically, the polyimide resin may be a weight average molecular weight (Mw) of 10,000 to 80,000 g/mol, 10,000 to 70,000 g/mol, or 10,000 to 60,000 g/mol, but is not limited thereto.

Hereinafter, a method of manufacturing a polyimide based film for a cover window according to an embodiment will be described.

The polyimide based film for a cover window according to an embodiment may be manufactured by a method including i) preparing a polyamic acid and/or a polyimide solution by reacting the compounds represented by the Chemical Formulas 1 and 2 and the compounds represented by the Chemical Formulas 3 and 4 under an organic solvent; and ii) applying the polyamic acid and/or polyimide solution obtained in the above step on a substrate, and heating and curing the polyamic acid and/or polyimide solution. Here, the compounds represented by the Chemical Formulas 1 and 2 may be dianhydride, and the compounds represented by Chemical Formulas 3 and 4 may be diamine.

Specifically, in the method of manufacturing a polyimide based film for a cover window according to an embodiment, the polyamic acid and/or the polyimide solution may comprise the structural unit derived from the compound represented by the Chemical Formula 1 in an amount of 70 to 95 mol % based on 100 mol % of the structural unit derived from the dianhydride. In this case, 5 to 30 mol %, which is the remaining mol %, may be a structural unit derived from the compound represented by the Chemical Formula 2.

Specifically, in the method of manufacturing a polyimide based film for a cover window according to an embodiment, the polyamic acid and/or polyimide solution may comprise the structural unit derived from the compound represented by the Chemical Formula 3 in an amount of 70 to 95 mol % based on 100 mol % of the structural unit derived from the diamine. In this case, 5 to 30 mol %, which is the remaining mol %, may be a structural unit derived from the compound represented by the Chemical Formula 4.

In addition, the polyamic acid and/or polyimide solution satisfying the above mole % may have a solid content of 10 to 40 wt % based on the total weight. Here, the solid content may be the polyamic acid and/or polyimide, and the remaining amount may be an organic solvent.

In the method of manufacturing a polyimide based film for a cover window according to an embodiment, the solid content of the polyamic acid and/or polyimide solution may be 10 to 30 wt % or 10 to 20 wt %. More specifically, according to an embodiment, even when the solid content of the polyamic acid and/or polyimide solution is 10 to 15 wt %, it may have a low viscosity to provide advantages in process. In general, the mechanical physical properties such as the absolute value of the retardation Rth in the thickness direction and the modulus have a trade-off relationship with each other, so it is difficult to simultaneously improve these physical properties. However, according to an embodiment, even at a thickness of 30 μm or more, it may have meaning in terms of being able to improve these physical properties at the same time.

In the method of manufacturing a polyimide based film for a cover window according to an embodiment, step i) may be performed in a polar solvent, specifically, an amide-based solvent.

The amide-based solvent may mean a compound containing amide moiety. The amide-based solvent may be aromatic or aliphatic, but may be, for example, aliphatic. In addition, for example, the amide-based solvent may be a cyclic compound or a chain compound, and specifically, may have 2 to 15 carbon atoms, for example, 3 to 10 carbon atoms.

The amide-based solvent may comprise an N,N-dialkylamide moiety, and the dialkyl groups are each independently present and fused with each other to form a ring, or at least one alkyl group of the dialkyl groups may be fused with other substitutents in molecules to form a ring, and for example, at least one alkyl group of the dialkyl group may be fused with an alkyl group connected to carbonyl carbon of the amide moiety to form a ring. Here, the ring may be tetragonal to heptagonal rings, and for example, may be pentagonal to heptagonal rings, and for example, a pentagonal or hexagonal ring. The alkyl group may be, for example, a C1 to C10 alkyl group, for example, a C1 to C8 alkyl group, for example, methyl or ethyl, and the like.

More specifically, the amide-based solvent is not limited as long as it is generally used for polymerization of the polyamic acid and/or polyimide, but may be, for example, dimethylpropionamide, diethylpropionamide, dimethylacetylamide, diethylacetamide, dimethylformamide, methylpyrrolidone, ethylpyrrolidone, octylpyrrolidone, or a combination thereof, and specifically may comprise dimethylpropionamide.

As described above, the polyamic acid and/or polyimide solution may have a solid content of 10 to 40% by weight based on the total weight. Accordingly, the degree of crystallinity of the polyamic acid and/or polyimide solution may be further reduced, and the low retardation in the thickness direction may be implemented. Specifically, it is possible to implement a low retardation in a thickness direction at a thickness of 30 μm or more, which may satisfy mechanical physical properties comparable to those of the tempered glass.

In the method for manufacturing a polyimide based film for a cover window according to an embodiment, step ii) may be performed through thermal curing. Here, in addition to the thermal curing, a chemical curing method, an infrared curing method, a batch curing method, a continuous curing method, etc. may be replaced by various known methods or replaced by a different curing method.

The thermal curing may be performed at 80 to 300° C., 100 to 280° C., or 150 to 250° C.

The thermal curing may be performed at 80 to 100° C. for 1 minute to 2 hours, at 100 to 200° C. for 1 minute to 2 hours, or at more than 200 to 300° C. for 1 minute to 2 hours. Stepwise thermal curing may be performed under two or more temperature conditions selected from these. In addition, the thermal curing may be performed in a separate vacuum oven, an oven filled with an inert gas, or the like, but is not necessarily limited thereto.

In addition, before the thermal curing, if necessary, a drying step may be additionally performed. The drying step may be performed at 30 to 70° C., 35 to 65° C., or 40 to 55° C., but is not limited thereto.

In addition, in the method of manufacturing a polyimide based film for a cover window according to an embodiment, the applying for forming the polyimide based film may be used without limitation as long as it is generally used in the relevant field. Non-limiting examples thereof may include knife coating, dip coating, roll coating, slot die coating, lip die coating, and slide coating, and curtain coating, and the like, and the like. In this regard, it goes without saying that the same type or different types can be sequentially applied one or more times.

The substrate may be used without limitation as long as it is conventionally used in the field, and non-limiting examples thereof may comprise: glass; stainless; or plastic films such as polyethylene terephthalate, polyethylene naphthalate, polypropylene, polyethylene, cellulose triacetate, cellulose diacetate, poly(meth)acrylic acid alkyl ester, a poly(meth)acrylic acid ester copolymer, polyvinyl chloride, polyvinyl alcohol, polycarbonate, polystyrene, cellophane, a polyvinylidene chloride copolymer, polyamide, polyimide, vinyl chloride/vinyl acetate copolymer, polytetrafluoroethylene, and polytrifluoroethylene.

Hereinafter, the use of the polyimide based film for a cover window according to the embodiment will be described.

The first aspect may be a multilayer structure including the polyimide based film for a cover window according to the embodiment. Here, the multilayer structure may include the polyimide based film for a cover window of the present disclosure and the polyimide based film including monomers of different compositions as two or more coating layers.

In addition, the second aspect may be a cover window for a display device including the polyimide based film for a cover window according to the embodiment and a coating layer formed on the film.

In addition, the third aspect may be a flexible display device including the polyimide based film for a cover window of the embodiment.

In the polyimide based film for a cover window according to the embodiment, the thickness may be 30 to 150 μm, the absolute value of the retardation Rth in the thickness direction at a wavelength of 550 nm may be 500 nm or less, and the yellow index (YI) according to ASTM E313 may be 3.0 or less. Specifically, when the polyimide based film for a cover window has a thickness of 30 to 150 μm, the absolute value of the retardation Rth in the thickness direction at a wavelength of 550 nm may be 400 nm or less, or 350 nm or less, or 50 to 300 nm. In addition, when the polyimide based film for a cover window has a thickness of 30 to 150 μm, the yellow index may be 3.0 or less, 2.7 or less, or 1 to 2.7. More specifically, the polyimide based film for a cover window may simultaneously satisfy the optical physical properties such as the retardation Rth in the thickness direction at a wavelength of 550 nm and the yellow index described above.

For example, when the polyimide based film for a cover window has a thickness of 40 to 80 μm, the absolute value of the retardation Rth in the thickness direction at a wavelength of 550 nm may be 50 to 250 nm, 80 to 240 nm, or 90 to 220 nm.

For example, when the polyimide based film for a cover window has a thickness of 40 to 80 μm, the yellow index may be 1.0 to 2.7, or 1.5 to 2.5.

For example, when the polyimide based film for a cover window has a thickness of 40 to 80 μm, the retardation in the thickness direction at a wavelength of 550 nm and the yellow index may be simultaneously satisfied.

In addition, when the polyimide based film for a cover window according to the embodiment has a thickness of 30 to 150 m, the polyimide based film may be a polyimide based film satisfying that (a) the modulus according to ASTM E111 is 4 GPa or more, and (b) the breaking elongation is 15% or more, and most specifically, may be a polyimide based film satisfying the above-described optical physical properties and mechanical physical properties. Furthermore, when the polyimide based film for a cover window has a thickness of 40 to 80 μm, the polyimide based film may equally satisfy the above-described mechanical physical properties.

The polyimide based film for a cover window according to the embodiment may have, specifically, a modulus of 4 GPa or more, 4.1 GPa or more, or 4.1 to 6 GPa according to ASTM E111. At the same time, the polyimide based film for a cover window may have a breaking elongation of 15% or more, 16% or more, 18% or more, 20% or more, or 25 to 40%. By having such physical properties, it is possible to provide the mechanical physical properties and durability more suitable for application to the cover window.

The first aspect, the second aspect or the third aspect according to the embodiment may include the polyimide based film that may remarkably reduce the distortion caused by light and satisfy the mechanical physical properties such as the modulus and the breaking elongation by implementing the low retardation in the thickness direction and the yellow index in a wide visible ray region. In addition, if necessary, the polyimide based film may further include a functional coating layer.

The functional coating layer may be formed on at least one other surface of the polyimide based film for a cover window according to the embodiment or the substrate. Non-limiting examples of the functional coating layer may include a hard coating layer, an antistatic layer, an anti-fingerprint layer, an antifouling layer, an anti-scratch layer, a low refractive layer, an antireflection layer, an impact absorption layer, and the like, and at least one or two or more functional coating layers may be provided. In this case, the thickness of the functional coating layer may be 1 to 500 μm, or 2 to 450 μm, or 2 to 200 μm, but is not limited thereto.

As described above, the polyimide based film for a cover window according to the embodiment has excellent optical physical properties and mechanical physical properties, and thus, may exhibit a sufficient retardation even at various angles including the cover window of the display device, so the polyimide based film may be applied to various industrial fields that require a wide viewing angle.

For example, the display device is not particularly limited as long as it is a field requiring excellent optical physical properties, and a display panel suitable for this may be selected and provided. Specifically, the polyimide based film for a cover window may be applied to a flexible display device. Non-limiting examples thereof include, but are not limited to, various image display devices such as a liquid crystal display device, an electroluminescence display device, a plasma display device, and a field emission display device.

In addition, the display device including the cover window polyimide based film according to the embodiment described above has excellent display quality as well as remarkably reduces the distortion by light, and in particular, may remarkably improve rainbow phenomenon in which iridescent stains occur, and minimize user's eye fatigue due to excellent visibility. In particular, as a screen size of the display device increases, the case of viewing the screen from the side increases. When the polyimide based film for a cover window according to the embodiment is applied to the display device, the visibility is excellent even from the side, so the polyimide based film may be usefully applied to the large display device.

Hereinafter, an embodiment will be given for a detailed description of an embodiment, but the present disclosure is not limited to Examples below.

In experiment below, the physical properties were measured as follows.

<Retardation Rth>

Retardation Rth was measured using AxoScan (OPMF, Axometrics Inc.) The retardation Rth in the thickness direction was measured for a wavelength of 450 nm to 650 nm, and the retardation Rth in the thickness direction at each of the wavelengths of 450 nm, 550 nm and 650 nm was expressed as an absolute value. The unit is nm.

<Yellow Index YI>

Yellowness was measured using a spectrophotometer (Nippon Denshoku, COH-5500) based on ASTM E313 standard.

<Modulus and Breaking Elongation>

According to ASTM E111, a specimen having a thickness of 50 μm, a length of 50 mm, and a width of 10 mm was measured using Instron's UTM 3365 under the conditions of pulling at 50 mm/min at 25° C. The unit of the modulus is Gpa, and the unit of the breaking elongation is %.

Example 1

Manufacture of Polyimide Based Film for Cover Window (TFMB (0.9)/DDS (0.1)/BPAF (0.7)/6FDA (0.3), Unit: Molar Ratio)

After filling 406.4 g of N,N-dimethylpropionamide (DMPA) in a reactor through which a nitrogen stream flows, 26.9 g of 2,2'-bis(trifluoromethyl)benzidine (TFMB) and 2.32 g of 4,4'-diaminodiphenyl sulfone (DDS) were dissolved. Here, 30 g of 9,9-bis (3,4-dicarboxyphenyl) fluorene dianhydride (BPAF) and 12.45 g of 2,2'-bis-(3,4-dicarboxylphenyl) hexafluoropropane dianhydride (6FDA) were added at 25° C., and dissolved and reacted while stirring for 24 hours. Thereafter, the DMPA solvent was additionally added so that the solid content was 14 wt % to prepare composition 1 for forming the polyimide based film for a cover window.

The obtained composition 1 for forming the polyimide based film for a cover window was applied to one surface of a glass surface (1.0 T) with #20 mayer bar, cured by heating at 80° C. for 15 minutes under a nitrogen stream, and then at 350° C. for 15 minutes, and peeled off from the glass substrate, thereby obtaining the polyimide based film for a cover window of Example 1 having a thickness of 50 μm.

Example 2

Manufacture of Polyimide Based Film for Cover Window (TFMB (0.85)/DDS (0.15)/BPAF (0.7)/6FDA (0.3), Unit: Molar Ratio)

After filling 404.5 g of N,N-dimethylpropionamide (DMPA) in a reactor through which a nitrogen stream flows, 25.4 g of 2,2'-bis(trifluoromethyl)benzidine (TFMB) and 3.47 g of 4,4'-diaminodiphenyl sulfone (DDS) were dissolved. Here, 30 g of 9,9-bis (3,4-dicarboxyphenyl) fluorene dianhydride (BPAF) and 12.45 g of 2,2'-bis-(3,4-dicarboxylphenyl) hexafluoropropane dianhydride (6FDA) were added at 25° C., and dissolved and reacted while stirring for 24 hours. Thereafter, a DMPA solvent was additionally added so that the solid content was 14 wt % to prepare composition 2 for forming the polyimide based film for a cover window.

The obtained composition 2 for forming the polyimide based film for a cover window was applied to one surface of a glass surface (1.0 T) with #20 mayer bar, cured by heating at 80° C. for 15 minutes under a nitrogen stream, and then at 350° C. for 15 minutes, and peeled off from the glass substrate, thereby obtaining the polyimide based film for a cover window of Example 2 having a thickness of 50 μm.

Example 3

Manufacture of Polyimide Based Film for Cover Window

The composition 1 for forming the polyimide based film for a cover window according to Example 1 was applied to one surface of a glass surface (1.0 T) with #20 mayer bar, cured by heating at 80° C. for 15 minutes under a nitrogen stream, and then at 350° C. for 15 minutes, and peeled off from the glass substrate, thereby obtaining the polyimide based film for a cover window of Example 3 having a thickness of 80 μm.

Examples 4 to 9

Manufacture of Polyimide Based Film for Cover Window

The polyimide based film for the cover window of Examples 4 to 9 having a thickness of 50 μm was obtained in the same method as in Example 1, except that the molar ratio of TFMB, DDS, BPAF, and 6FDA was changed as shown in Table 1 below.

Comparative Example 1

Manufacture of Polyimide Based Film for Cover Window (TFMB (0.99)/BPAF (1), Unit: Molar Ratio)

After filling 370 g of DMPA in a reactor through which a nitrogen stream flows, 20.74 g of TFMB was dissolved while the temperature of the reactor was maintained at 25° C. Here, 30 g of BPAF was added at 25° C. and dissolved and reacted while stirring for 24 hours. Thereafter, a DMPA solvent was additionally added so that the solid content was 12 wt % to prepare composition A for forming the polyimide based film for a cover window.

The obtained composition A for forming the polyimide based film for a cover window was applied to one surface of a glass surface (1.0 T) with #20 mayer bar, cured by heating at 80° C. for 15 minutes under a nitrogen stream, and then at 350° C. for 15 minutes, and peeled off from the glass substrate, thereby obtaining the polyimide based film for a cover window of Comparative Example 1 having a thickness of 50 μm.

Comparative Example 2

Manufacture of Polyimide Based Film for Cover Window (TFMB (0.99)/6FDA (1), Unit: Molar Ratio)

After filling 260 g of DMPA in a reactor through which a nitrogen stream flows, 21.4 g of TFMB was dissolved while the temperature of the reactor was maintained at 25° C. Here, 30 g of 6FDA was added at room temperature, dissolved for a certain period of time, and dissolved and reacted while stirring for 24 hours. Thereafter, a DMPA solvent was additionally added so that the solid concentration was 12 wt % to prepare composition B for forming the polyimide based film for a cover window.

The obtained composition B for forming the polyimide based film for a cover window was applied to one surface of a glass surface (1.0 T) with #20 mayer bar, cured by heating at 80° C. for 15 minutes under a nitrogen stream, and then at 350° C. for 15 minutes, and peeled off from the glass substrate, thereby obtaining the polyimide based film for a cover window of Comparative Example 2 having a thickness of 50 μm.

Comparative Example 3

Manufacture of Polyimide Based Film for Cover Window (TFMB (1)/PMDA (0.3)/BPAF (0.7), Unit: Molar Ratio)

After filling 484 g of N,N-dimethylpropionamide (DMPA) in a reactor through which a nitrogen stream flows, 29.9 g of 2,2'-bis(trifluoromethyl)benzidine (TFMB) was dissolved while the temperature of the reactor was maintained at 25° C. Here, 30 g of 9,9-bis (3,4-dicarboxyphenyl) fluorene dianhydride (BPAF) and 6.1 g of pyromellitic dianhydride (PMDA) were added at 25° C., and dissolved and reacted while stirring for 24 hours. Thereafter, a DMPA solvent was additionally added so that the solid content was 12 wt % to prepare composition C for forming the polyimide based film for a cover window.

The obtained composition C for forming the polyimide based film for a cover window was applied to one surface of a glass surface (1.0 T) with #20 mayer bar, cured by heating at 80° C. for 15 minutes under a nitrogen stream, and then at 350° C. for 15 minutes, and peeled off from the glass substrate, thereby obtaining the polyimide based film for a cover window of Comparative Example 3 having a thickness of 50 μm.

Comparative Example 4

Manufacture of Polyimide Based Film for Cover Window (TFMB (1)/PMDA (0.7)/BPAF (0.3), Unit: Molar Ratio)

The polyimide based film for the cover window of Comparative Example 4 having a thickness of 50 μm was obtained in the same method as in Comparative Example 3, except that the molar ratio of TFMB, PMDA, and BPAF was changed as shown in Table 1 below.

Evaluation: Optical and Mechanical Physical Properties

The yellow index (YI), the retardation, the modulus, and the breaking elongation of the polyimide based film for a cover window of Examples 1 to 9 and Comparative Examples 1 to 4 were measured and shown in Tables 2 and 3 below.

TABLE 1

| | Composition (unit: molar ratio) |
|---|---|
| Example 1 | TFMB(0.9)/DDS(0.1)/BPAF(0.7)/6FDA(0.3) |
| Example 2 | TFMB(0.85)/DDS(0.15)/BPAF(0.7)/6FDA(0.3) |
| Example 3 | Same as Example 1 |
| Example 4 | TFMB(0.8)/DDS(0.2)/BPAF(0.8)/6FDA(0.2) |
| Example 5 | TFMB(0.7)/DDS(0.3)/BPAF(0.7)/6FDA(0.3) |
| Example 6 | TFMB(0.6)/DDS(0.4)/BPAF(0.7)/6FDA(0.3) |
| Example 7 | TFMB(0.7)/DDS(0.3)/BPAF(0.6)/6FDA(0.4) |
| Example 8 | TFMB(0.6)/DDS(0.4)/BPAF(0.6)/6FDA(0.42) |
| Example 9 | TFMB(0.5)/DDS(0.5)/BPAF(0.5)/6FDA(0.5) |
| Comparative Example 1 | TFMB(0.99)/BPAF(1) |
| Comparative Example 2 | TFMB(0.99)/6FDA(1) |
| Comparative Example 3 | TFMB(1)/PMDA(0.3)/BPAF(0.7) |
| Comparative Example 4 | TFMB(1)/PMDA(0.7)/BPAF(0.3) |

TABLE 2

| | Example 1 | Example 2 | Example 3 | Example 4 | Example 5 | Example 6 | Example 7 |
|---|---|---|---|---|---|---|---|
| Thickness (μm) | 50 | 50 | 80 | 50 | 50 | 50 | 50 |
| YI | 2.1 | 2.2 | 2.5 | 2.1 | 2.2 | 2.6 | 3.1 |
| Rth(550 nm) | 250 | 235 | 309 | 224 | 210 | 160 | 140 |
| Rth(450 nm) | 267 | 251 | 330 | 239 | 224 | 171 | 149 |
| Rth(650 nm) | 240 | 228 | 296 | 215 | 201 | 155 | 134 |
| Expression 1 | 1.07 | 1.07 | 1.07 | 1.07 | 1.07 | 1.07 | 1.07 |
| Expression 2 | 0.96 | 0.96 | 0.96 | 0.96 | 0.96 | 0.96 | 0.96 |
| Modulus (Gpa) | 4.6 | 4.4 | 4.5 | 4.4 | 4.4 | 3.6 | 3.6 |
| Breaking elongation (%) | 25 | 30 | 25 | 25 | 26 | 80 | 36 |

TABLE 3

| | Example 8 | Example 9 | Comparative Example 1 | Comparative Example 2 | Comparative Example 3 | Comparative Example 4 |
|---|---|---|---|---|---|---|
| Thickness (μm) | 50 | 50 | 50 | 50 | 50 | 50 |
| YI | 3.2 | 3.5 | 2.1 | 3.1 | 53 | 80 |
| Rth(550 nm) | 130 | 115 | 240 | 580 | 1800 | 2800 |
| Rth(450 nm) | 139 | 123 | 278 | 561 | 1962 | 3051 |
| Rth(650 nm) | 124 | 111 | 248 | 908 | 1692 | 2633 |
| Expression 1 | 1.07 | 1.07 | 1.06 | 1.09 | 1.09 | 1.09 |
| Expression 2 | 0.96 | 0.97 | 0.96 | 0.98 | 0.94 | 0.95 |
| Modulus (Gpa) | 3.5 | 3.5 | 4.7 | 3.5 | 6.7 | 7.2 |
| Breaking elongation (%) | 36 | 35 | 6 | 20 | 15 | 21 |

Referring to Tables 2 and 3, it could be seen that, in the polyimide based film for a cover window according to Examples 1 to 9, even at a thickness of 50 μm or more, which is sufficient for use as a cover window, the absolute value of the retardation in the thickness direction at a wavelength of 550 nm is 500 nm or less, and the yellow index (YI) according to ASTM E313 is 3.5 or less. Therefore, the polyimide based film for a cover window according to Examples 1 to 9 has the low retardation Rth in the thickness direction in a wide visible ray region, and thus, has the high breaking elongation with the high strength characteristics while remarkably improving the reflective appearance, so the polyimide based film may be suitable to be applied as a cover window of a foldable display device or a flexible display device.

On the other hand, it could be seen that the polyimide based film for a cover window according to Comparative Example 1 has a low breaking elongation of 5% or less, and thus, has low mechanical physical properties, so the polyimide based film is not suitable for application for a cover window, and the polyimide film for a cover window of Comparative Examples 2 to 4 has the absolute value of the retardation in the thickness direction at a wavelength of 550 nm as high as 500 nm or more, and thus is not suitable for application for cover windows. In addition, it could be seen that the polyimide based film for a cover window of Comparative Examples 3 and 4 is a colored film with poor visibility since it has very high absolute value of retardation in the thickness direction at a wavelength of 550 nm as 1800 nm and 2800 nm, and a very high yellow index of 53 and 80, and thus, is not suitable for application as a cover window.

Hereinabove, although one embodiment has been described by limited examples, these are only provided to help a more general understanding of the present disclosure. Therefore, the present disclosure is not limited to the embodiments. Various modifications and changes may be made by those skilled in the art to which the present disclosure pertains from this description.

Therefore, the spirit of the present disclosure should not be limited to these embodiments, but the claims and all of modifications equal or equivalent to the claims are intended to fall within the scope and spirit of the present disclosure.

The invention claimed is:

1. A polyimide-based film of a cover window, comprising:
a structural unit derived from a dianhydride, and a structural unit derived from a diamine;
wherein the structural unit derived from the dianhydride comprises a structural unit derived from a compound represented by Chemical Formula 1 below and a structural unit derived from a compound represented by Chemical Formula 2 below,
the structural unit derived from the diamine comprises a structural unit derived from a compound represented by Chemical Formula 3 below and a structural unit derived from a compound represented by Chemical Formula 4 below, and
in the polyimide-based film, a thickness is 30 to 150 μm, an absolute value of retardation in a thickness direction at a wavelength of 550 nm is 500 nm or less, and a yellow index (YI) according to ASTM E313 is 3.5 or less:

[Chemical Formula 1]

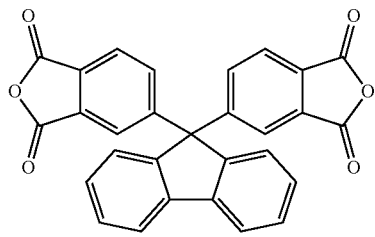

[Chemical Formula 2]

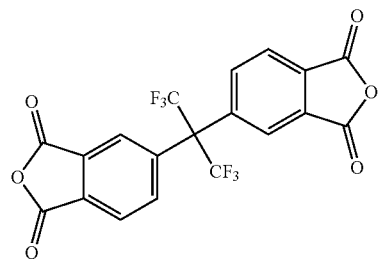

[Chemical Formula 3]

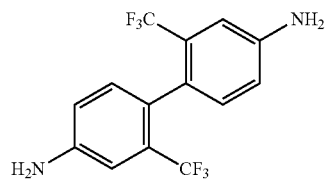

[Chemical Formula 4]

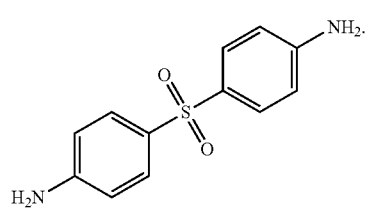

2. The polyimide-based film of claim 1, wherein wavelength dispersibility satisfies Expressions 1 and 2 below:

$$1.06 \leq Rth(450\ nm)/Rth(550\ nm) \leq 1.10 \quad \text{[Expression 1]}$$

$$0.95 \leq Rth(650\ nm)/Rth(550\ nm) \leq 0.98 \quad \text{[Expression 2]}$$

in the Expressions 1 and 2 above,
Rth (450 nm) is an absolute value (unit, nm) of retardation in a thickness direction at a wavelength of 450 nm,
Rth (550 nm) is an absolute value (unit, nm) of retardation in a thickness direction at a wavelength of 550 nm, and
Rth (650 nm) is an absolute value (unit, nm) of retardation in a thickness direction at a wavelength of 650 nm.

3. The polyimide-based film of claim 1, wherein a modulus according to ASTM E111 is 4 GPa or more, and a breaking elongation is 15% or more.

4. The polyimide-based film of claim 1, wherein the structural unit derived from the compound represented by the Chemical Formula 1 is included in an amount of 70 to 95 mol % based on 100 mol % of the structural unit derived from the dianhydride.

5. The polyimide-based film of claim 4, wherein the structural unit derived from the compound represented by the Chemical Formula 3 is included in an amount of 70 to 95 mol % based on 100 mol % of the structural unit derived from the diamine.

6. The polyimide-based film of claim 5, wherein a thickness is 40 to 80 μm, an absolute value of retardation Rth in a thickness direction at a wavelength of 550 nm is 50 to 250 nm, a yellow index (YI) according to ASTM E313 is 1.0 to 2.7, a modulus according to ASTM E111 is 4 GPa or more, and a breaking elongation is 15% or more.

7. A multilayer structure comprising the polyimide-based film according to claim 1 formed on one surface of a substrate.

8. A cover window for a display device, comprising:
the polyimide-based film according to claim 1; and
a coating layer formed on the polyimide-based film.

9. The cover window for a display device of claim 8, wherein the coating layer is a hard coating layer, an antistatic layer, an anti-fingerprint layer, an antifouling layer, an anti-scratch layer, a low refractive layer, an antireflection layer, an impact absorption layer, or a combination thereof.

10. A flexible display device comprising the polyimide-based film according to claim 1.

* * * * *